US012172462B2

(12) United States Patent
Mercado

(10) Patent No.: US 12,172,462 B2
(45) Date of Patent: Dec. 24, 2024

(54) PAINT BRUSH DEVICE

(71) Applicant: Reynaldo Mercado, Bronx, NY (US)

(72) Inventor: Reynaldo Mercado, Bronx, NY (US)

( * ) Notice: Subject to any disclaimer, the term of this patent is extended or adjusted under 35 U.S.C. 154(b) by 0 days.

(21) Appl. No.: 18/337,335

(22) Filed: Jun. 19, 2023

(65) Prior Publication Data

US 2024/0066912 A1 Feb. 29, 2024

Related U.S. Application Data

(60) Provisional application No. 63/373,822, filed on Aug. 29, 2022.

(51) Int. Cl.
*B44D 3/00* (2006.01)
*A46B 7/04* (2006.01)
*B44D 3/12* (2006.01)

(52) U.S. Cl.
CPC ................ *B44D 3/123* (2013.01); *A46B 7/04* (2013.01); *A46B 2200/202* (2013.01)

(58) Field of Classification Search
None
See application file for complete search history.

(56) References Cited

U.S. PATENT DOCUMENTS

| | | | | |
|---|---|---|---|---|
| 888,896 A * | 5/1908 | Howard | A46B 17/02 | 248/685 |
| 1,215,052 A * | 2/1917 | Nelon | A46B 17/02 | 248/685 |
| 1,228,774 A * | 6/1917 | Hecht | A46B 17/02 | 248/685 |
| 1,694,860 A * | 12/1928 | Lesiak | A46B 11/0093 | 15/248.1 |
| 2,171,920 A * | 9/1939 | Dorsey | B44D 3/123 | 248/692 |
| 3,231,919 A | 2/1966 | Macdonald | | |
| 4,266,686 A | 5/1981 | Carter | | |
| 4,887,327 A | 12/1989 | Meimeteas | | |
| 5,044,038 A | 9/1991 | Matkovic | | |
| 5,406,668 A | 4/1995 | Goodhue | | |
| 6,244,559 B1 | 6/2001 | Stanton | | |
| D654,783 S | 2/2012 | Warren | | |
| 2012/0224909 A1* | 9/2012 | Saravia Castillon | F04B 15/02 | 401/118 |
| 2017/0007012 A1* | 1/2017 | Aide | B44D 3/123 | |

* cited by examiner

*Primary Examiner* — Steven M Marsh

(57) ABSTRACT

A smart brush holder device is disclosed. The smart brush holder device comprises a brush, an internal spring along one side, a sliding switch, a hook, and a spring for the hook.

20 Claims, 7 Drawing Sheets

PAINT BRUSH DEVICE

FIELD OF INVENTION

The invention relates generally to a paint brush with a retractable/extendable hook. The hook can be released from its resting, flush position into an erect position via a sliding switch and a spring. The brush can then be hung on the inner lip of a paint can when the brush is not in use. After usage, the hook can then be stored back into a recess on the brush. The objective of the present invention is to allow users to store the brush in a user-friendly manner when it is not in use.

BACKGROUND OF THE INVENTION

Oftentimes when a user is painting a surface in a building, such as a wall, there is no proper place to put a wet paint brush. Sometimes the paint brush is placed on top of a newspaper covering, on the floor. However, if the user does so he/she may accidentally step on it later, creating a mess. If the user chooses to place the paint brush inside the paint can, this results in the need to fish out the brush later.

Some prior art have solved this problem by integrating a hook into the handle. The user can thus hang the brush on the lip of the paint can, or on their tool belt. Unfortunately, such systems are inconvenient because the hook may catch on clothes or other nearby protrusion.

The invention's solution is to create a retractable hook, extensible by a subsystem of springs and a switch. In this manner the brush's hook can be easily retracted and the brush stored in a pocket Like some prior art, the brush can also be hung on the lip of a paint can, allowing the paint on the brush to drip directly into the paint can/bucket. The user can then continue onto other steps in the painting process, like using the paint roller.

The objective of the present invention is to present a paint brush system with easy storage during the painting process. The present invention is designed to be quick, user-friendly, with a snap-in-and-out system extension/retraction subsystem.

SUMMARY OF THE INVENTION

The brush is designed to be easy to store when it is not in use during painting tasks. As mentioned, the brush is specifically meant for idle moments when the brush itself is not in use, but the painting process is still in progress. During these times the brush is still wet with paint, and the user may not wish to place it on a flat surface, even if the surface is disposable such as used newspaper. Such a method can still be messy and create unpleasant working conditions.

The invention is a brush with a hinged hook and an internal switch. The rear end of the hook has a spring and a tiny notch on the back on the hook. The hook pops up into the extended position when the switch is used.

For storage, when the user presses the hook down, the notch locks into place on the switch. The hook is now in the storage position, and can be easily pocketed or slid into a tool belt slot.

DETAIL DESCRIPTIONS OF THE INVENTION

Figure 1:
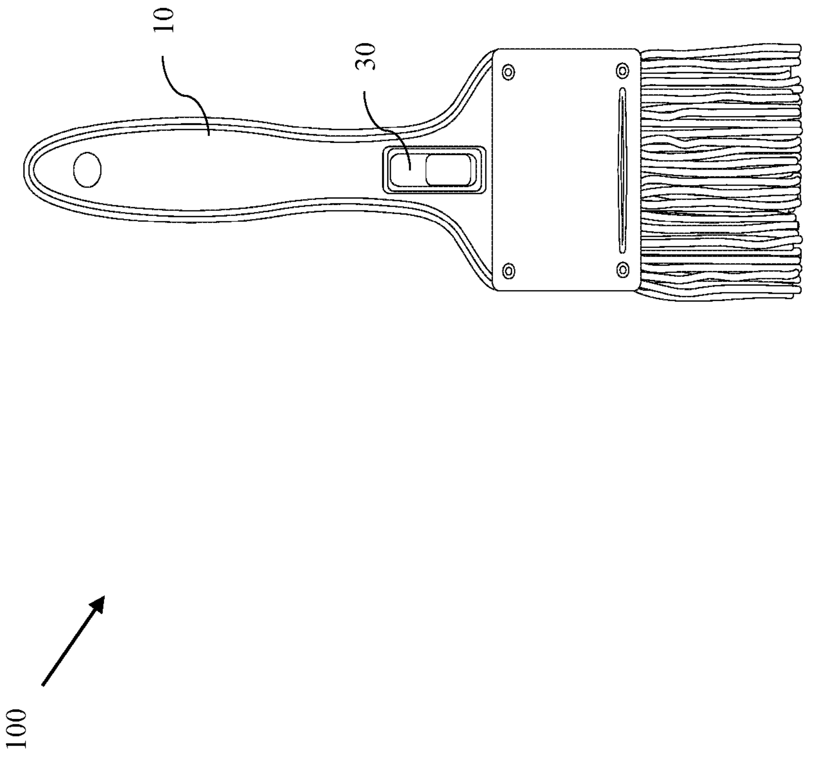
FIG. 1. An illustration of one embodiment of the present invention showing the front side of the brush.

All illustrations of the drawings are for the purpose of describing selected versions of the present invention and are not intended to limit the scope of the present invention.

As shown in FIGS. 1-3 and 5-7, the present invention provides a smart brush holder device 100 comprising a brush 10, an internal spring 20 along one side, a sliding switch 30, a hook 40, and a spring 50 for the hook 40.

In one embodiment, the smart brush holder device 100 of the present invention can include a brush 10 having a slot 45; an internal spring 20 attached along one side of the brush 10; a sliding switch 30 slidably attached to the brush 10 and the internal spring 20; a hook 40 having a notch 42, the hook 40 is hingedly attached to the brush 10, and a spring hook 50 attached to the hook 40 and the brush 10.

Some of these components may comprise other subcomponents/sub-processes which will be discussed later in this disclosure.

Figure 5:
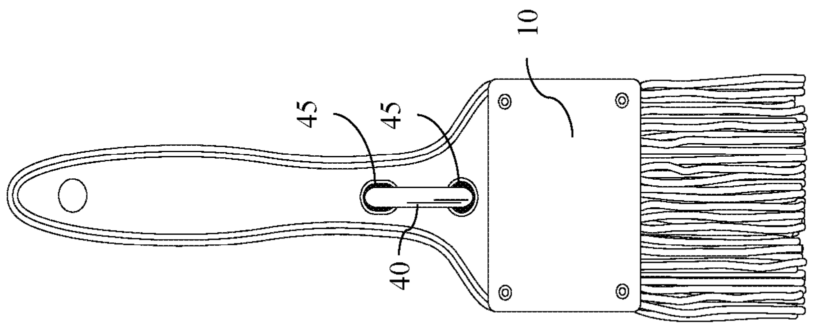
FIG. 5. An illustration of one embodiment of the present invention showing the back side of the brush.

The first major component of the present invention is the brush 10. In one embodiment, the brush 10 includes an aperture or slot 45, as shown in FIG. 5. The brush 10 acts as a chassis and attachment point for the other components. The brush 10 can be very much like a standard brush or any other type of brush 10.

In one embodiment, the brush 10 can include a slot 45 for the hook 10 and a partially hollow interior in any shape for any interior components such as the sliding switch 30 and springs 20, 50.

The slot 45, hook 10, and other components are discussed in detail later in this disclosure.

The next major component of the present invention is the internal spring 20. In some embodiments, the internal spring 20 can be located within the brush 10, along one side of the brush 10. This internal spring 20 can also be located directly behind the switch 30.

In some embodiments, the internal spring's 20 first end can be affixed to the brush's 10 interior housing and the second end can be affixed to the end of the sliding switch 30.

During usage, the user may pull back on the sliding switch 30. Then, the internal spring 20 will compress, and the sliding switch 30 moves back into a position such that the hook 40 is released. After the user releases the sliding switch 30, the internal spring 20 will decompress and the sliding switch 30 will return to its original resting position.

In the present invention's preferred embodiment, the sliding switch 30 can be a small rectangular piece with a suitable material such as plastic. The function of the sliding switch 30 is to release the hook when the switch is pulled back.

In some embodiments, the sliding switch 30 can be partially located within the brush interior, with the exterior grip surface protruding from the brush's surface.

The portion of the sliding switch 30 within the brush's interior can be affixed to the aforementioned internal spring 20.

In the invention's preferred embodiment, the exterior portion of the sliding switch 30 is located on the underside of the brush surface, directly in the center of the brush 10 for user convenience. In alternative or future embodiments of the invention, the sliding switch 30 may be located in any other different area on the brush 10.

In some embodiments, the sliding switch 30 may have friction grips, or a tab on the exterior surface to facilitate traction.

The aperture/slot 45 of the present invention can be a long hole from which the hook 40 can protrude. In one embodiment, the dimensions of this slot 45 can be the same as the length and width of the hook 40, from end-to-end on the respective axes. The slot 45 can be located in the center of the brush 10, aligned along the brush's length 10.

Figure 2:
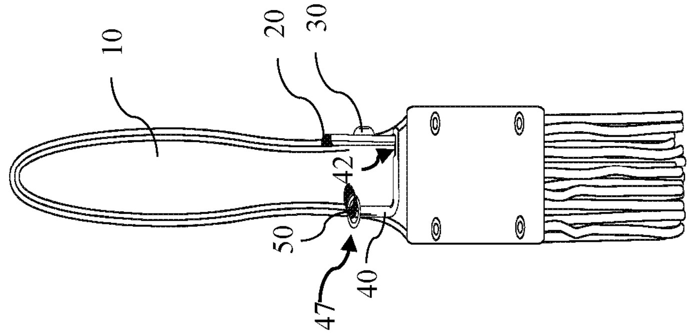
FIG. 2. An illustration of a cross-sectional view of the present invention showing the hook folded into the brush.

In some embodiments, the hook 40 can be located inside of the brush 10, as shown in FIG. 2.

Figure 3:
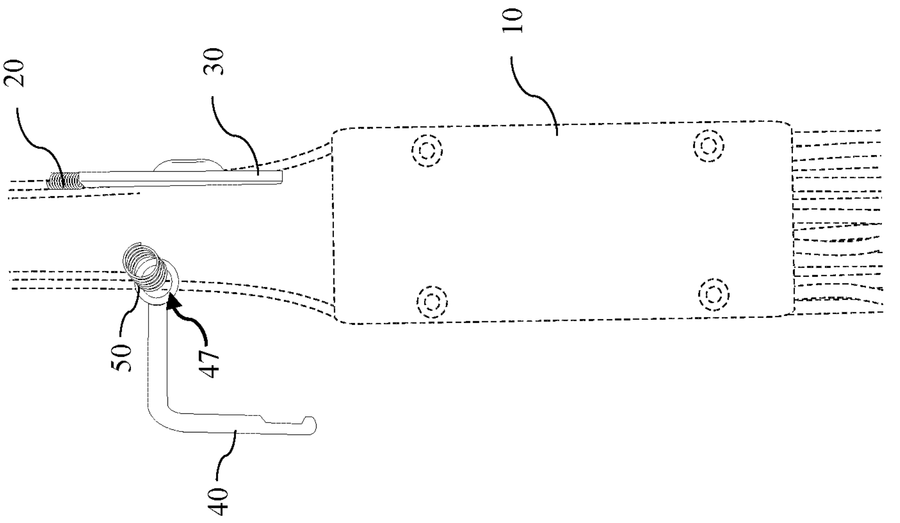
FIG. 3. An illustration of a cross-sectional view of the present invention showing the hook unfolded.
Figure 4:
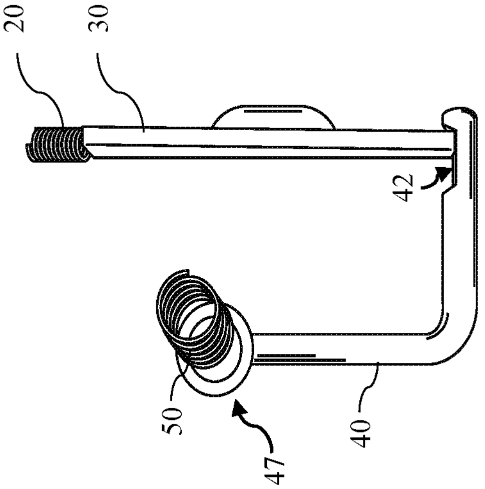
FIG. 4. An illustration of one embodiment of the hook and the sliding switch of the present invention.

The hook 40 shown in FIGS. 2-4, may include two main configurations. The first configuration is when the hook 40 is in a stored state, the second is when the hook 40 is in a released or extended state/position.

While the hook 40 is in a stored state, the hook 40 is folded into the slot 45, aligned along the brush's length. This is the first configuration.

After the sliding switch 30 is pulled back, the spring pulls the hook 40 into an upright position. The hook 40 is then aligned perpendicularly to the brush's length. This is the second configuration. The hook 40 can be an L-shape hook, a semi-circled or any other suitable shape hook and one end of the hook 40 can include a hinge point 47 so that the hook 40 can be hingedly attached to the brush 10.

In some embodiments, the hook 40 may include a notch 42, which may be located at the end of the hook 40. This notch 42 acts as a point of contact for the sliding switch 30. In some embodiments, while the hook 40 is in a stored state, the switch is flush against and in the notch 42, in a male-female connection. When the sliding switch 30 is pulled back, the sliding switch 30 withdraws from the notch 42, and the hook 40 is released into the extended position.

The spring for the hook can be called a "spring-hook." 50 This is not to be confused with the internal spring 20.

In one embodiment, the spring-hook 50 can be located within the partially hollow interior of the brush 10. The spring-hook's 50 first end can be affixed to the inside of the brush's housing. The second end of the spring-hook 50 can be affixed to the rear of the hook's hinge point 47.

In some embodiments, the spring-hook 50 can be arranged in a semi-circle. This design may allow the user to pull the hook 40 and for compactness.

In one embodiment, in the hook's stored state, the spring-hook 50 can be wound tightly around the hook's rear hinge point 47, and is in a stretched state. After the user pulls the sliding switch 30, the spring-hook 50 retracts into a near-resting state and releases the hook 40 into its extended position.

Herein follows a description of the interactions of the major components and the invention's usage.

The brush 10 acts as a chassis and attachment point for the other components in the invention. The brush 10 has a partially hollow interior. There is the internal spring 20 along one side. The internal spring 20 is connected to the sliding switch 30.

The sliding switch 30 has an exterior portion that is located on the underside of the brush 10, in the center of the brush 10. There is a slot 45 on the side of the brush 10, which may act as a recess for the hook 40 when the hook 40 is in a stored position. The hook 40 itself can be a hinged hook connected to the interior of the brush 10.

In one embodiment, the spring-hook 50 can be wrapped in a semi-circle around the hinge point 47 of the hook 40. The spring-hook 50 is in an extended state at this time.

When the user pulls back on the sliding switch 30, the internal spring 20 compresses. The hook 40 is released, and the spring-hook 50 pulls on the hook 40 so that the hook 40 is standing upright in the extended position. The spring-hook 50 is now in a near-resting state. As soon as the user releases the sliding switch, the internal spring 20 decompresses back into its resting state.

To store the hook 40, the user presses down on the hook 40. One end of the sliding switch 30 engages the notch 42 and holds the hook 40 in its stored position. The hook 40 thus locks into place via its notch 42 in the front.

The hook 40 is now stored in the slot 45 and the brush 10 can be placed back onto the user's tool belt or similar accessory.

Figure 6:
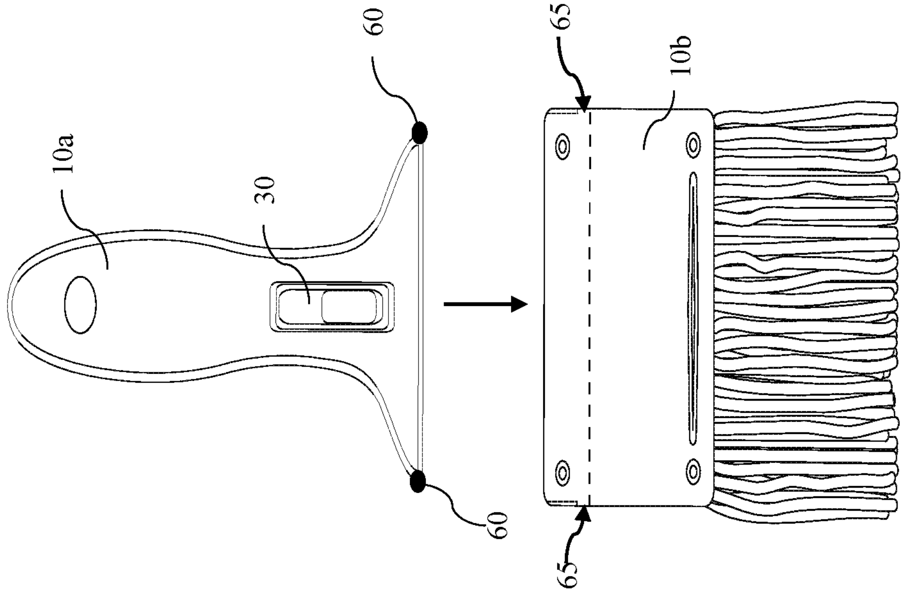
FIG. 6. An illustration of one embodiment of the present invention, showing the brush portion with balls and the handle portion.
Figure 7:
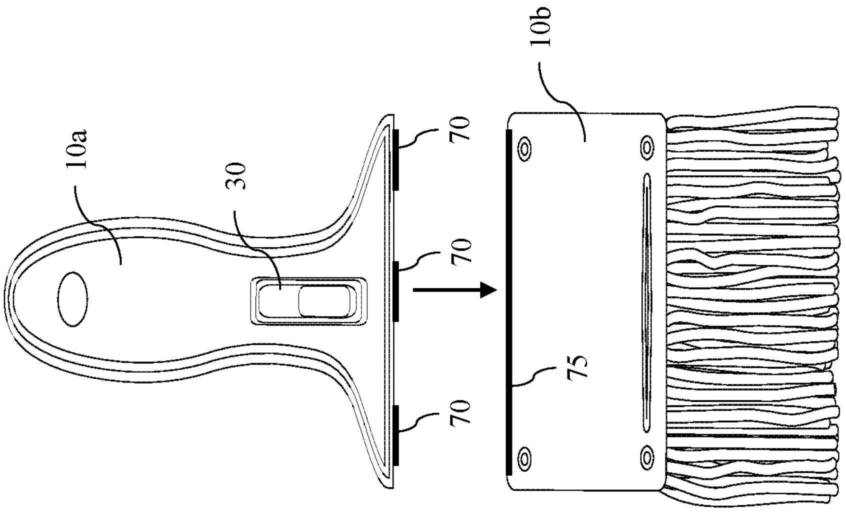
FIG. 7. An illustration of one embodiment of the present invention, showing the brush portion with magnets and the handle portion.

In some embodiments, the brush 10 of the present invention may include a brush portion 10*a* and a handle portion 10*b* detachably attached to the brush portion 10*a*, as shown in FIG. 6 and FIG. 7, which can be detachably attached to the brush portion 10*a*.

As shown in FIG. 7, the brush portion 10*a* may include a metal 75 that can be magnetically attached to a plurality of magnets 70 attached to the handle portion 10*b*, wherein the magnets 70 can be positioned on suitable locations of the handle portion 10*b*.

As shown in FIG. 6, in some other embodiments, the brush portion 10*a* may include a hole 65 on each side and the handle portion 10*b* may include balls 60 that can be engaged in the hole 65 so that the handle portion 10*b* and the brush portion 10*a* can be attached together.

Although the invention has been explained in relation to its preferred embodiment, it is to be understood that many other possible modifications and variations can be made without departing from the spirit and scope of the invention.

Obvious changes, modifications, and substitutions may be made by those skilled in the art to achieve the same purpose the invention.

The exemplary embodiments are merely examples and are not intended to limit the scope of the invention. It is intended that the present invention cover all other embodiments that are within the scope of the descriptions and their equivalents.

The following is claimed:

1. Smart brush holder device comprising: a brush having a slot; an internal spring attached along one side of the brush; a sliding switch slidably attached to the brush and the internal spring; a hook having a notch, the hook is hingedly attached to the brush, and a spring hook attached to the hook and the brush.

2. He smart brush holder device as claimed in claim 1, wherein the hook is an L shaped hook.

3. He smart brush holder device as claimed in claim 1, wherein the hook is a semi-circled hook.

4. He smart brush holder device as claimed in claim 1, wherein the brush includes a brush portion and a handle portion detachably attached together.

5. He smart brush holder device as claimed in claim 4, wherein the brush portion includes a hole on each side of the brush.

6. He smart brush holder device as claimed in claim 4, wherein the handle portion includes a ball on each side of the handle portion.

7. He smart brush holder device as claimed in claim 4, wherein the brush portion includes a metal.

8. He smart brush holder device as claimed in claim 4, wherein the handle portion includes a plurality of magnets.

9. Smart brush holder device comprising: a brush having a slot located on a side of the brush, the brush includes a brush portion and a handle portion detachably attached together; an internal spring attached along one side of the brush; a sliding switch slidably attached to the brush and the internal spring; a hook having a notch, the hook is hingedly attached to the brush, and a spring hook attached to the hook and the brush.

10. He smart brush holder device as claimed in claim 9, wherein the hook is an L shaped hook.

11. He smart brush holder device as claimed in claim 9, wherein the hook is a semi-circled hook.

12. He smart brush holder device as claimed in claim 9, wherein the brush portion includes a hole on each side the brush.

13. He smart brush holder device as claimed in claim 9, wherein the handle portion includes a ball on each side of the handle portion.

14. Smart brush holder device comprising: a brush having a slot, the brush includes a brush portion and a handle portion magnetically attached together; an internal spring attached along one side of the brush; a sliding switch slidably attached to the side of the brush and the internal spring; a hook having a notch, the hook is hingedly attached to the brush, and a spring hook attached to the hook and the brush.

15. He smart brush holder device as claimed in claim 14, wherein the hook is an L shaped hook.

16. He smart brush holder device as claimed in claim 14, wherein the hook is a semi-circled hook.

17. He smart brush holder device as claimed in claim 14, wherein the brush portion includes a metal.

18. He smart brush holder device as claimed in claim 14, wherein the handle portion includes a plurality of magnets.

19. He smart brush holder device as claimed in claim 14, wherein the handle portion is configured to slide into the brush portion.

20. He smart brush holder device as claimed in claim 14, wherein the brush portion is configured to slide into the handle portion.

* * * * *